United States Patent [19]
Miller et al.

[11] Patent Number: 5,906,047
[45] Date of Patent: May 25, 1999

[54] MANUFACTURE OF GREASE FITTINGS AND BLANKS THEREFOR

[75] Inventors: Daniel S. Miller; Jerry D. Shew, both of Charlotte; Jerry V. Burton, Lincolnton, all of N.C.; John T. Callicotte, Jr., Telford, Tenn.; Gerald F. Kramer, Gate City, Va.

[73] Assignee: Alemite Corporation, Charlotte, N.C.

[21] Appl. No.: 08/601,795

[22] Filed: Feb. 15, 1996

[51] Int. Cl.$^6$ ................................................ B21C 23/00
[52] U.S. Cl. ...................... 29/890.132; 29/437; 29/558; 72/355.2; 72/356; 184/105.3
[58] Field of Search ............... 184/105.3; 411/427; 470/89, 91; 29/890.132, 436, 437, 439, 511, 557, 558; 72/353.2, 355.2, 355.6, 356

[56] References Cited

U.S. PATENT DOCUMENTS

| | | | |
|---|---|---|---|
| 393,792 | 12/1888 | Sternbergh | 470/89 |
| 1,619,455 | 3/1927 | Zerk | 184/105.3 |
| 1,695,496 | 12/1928 | Jacques . | |
| 1,716,500 | 6/1929 | Moore . | |
| 1,832,168 | 11/1931 | Wilcox | 470/89 |
| 1,928,841 | 10/1933 | Morse | 29/157.1 |
| 2,542,023 | 2/1951 | Friedman | 10/86 |
| 2,751,676 | 6/1956 | Kaul | 29/535 |
| 3,186,209 | 6/1965 | Friedman | 72/334 |
| 3,417,450 | 12/1968 | Zell | 29/157.1 |
| 3,899,912 | 8/1975 | Orain | 72/344 |
| 4,352,283 | 10/1982 | Bailey | 72/354 |
| 4,362,043 | 12/1982 | Hanson | 72/354 |
| 4,463,590 | 8/1984 | Theobald | 72/354 |
| 4,574,609 | 3/1986 | Berecz | 72/354 |
| 4,595,080 | 6/1986 | Shay | 184/105.3 |
| 4,803,880 | 2/1989 | Hopkins et al. | 72/354 |
| 4,932,251 | 6/1990 | Okada et al. | 72/334 |
| 4,967,584 | 11/1990 | Sato et al. | 72/356 |
| 5,080,198 | 1/1992 | Rice | 184/105.3 |
| 5,119,663 | 6/1992 | Bottger | 72/355.2 |
| 5,129,251 | 7/1992 | Takikawa | 72/334 |

FOREIGN PATENT DOCUMENTS

| 5783324 | 5/1982 | Japan | B23P 15/00 |
|---|---|---|---|

*Primary Examiner*—Joseph M. Gorski
*Attorney, Agent, or Firm*—William G. Dosse; Moore & Van Allen, PLLC

[57] ABSTRACT

A grease fitting is made by forming its outer shell in a series of cold forging steps to make a blank with the necessary thread blank at one end, a hexagonal center portion, and with a grease-fitting-mating nipple outline at the other end. Threads are rolled onto the thread blank, and the grease-gun-mating nipple is rolled to smooth and burnish its surface. The grease fitting is then successively drilled to make a hole of three different diameters to form the one-way valve ball seat and two ball spring clearance diameters. The ball and spring are inserted, and the end of the hole is formed over the end of the spring to capture the spring into place.

2 Claims, 4 Drawing Sheets

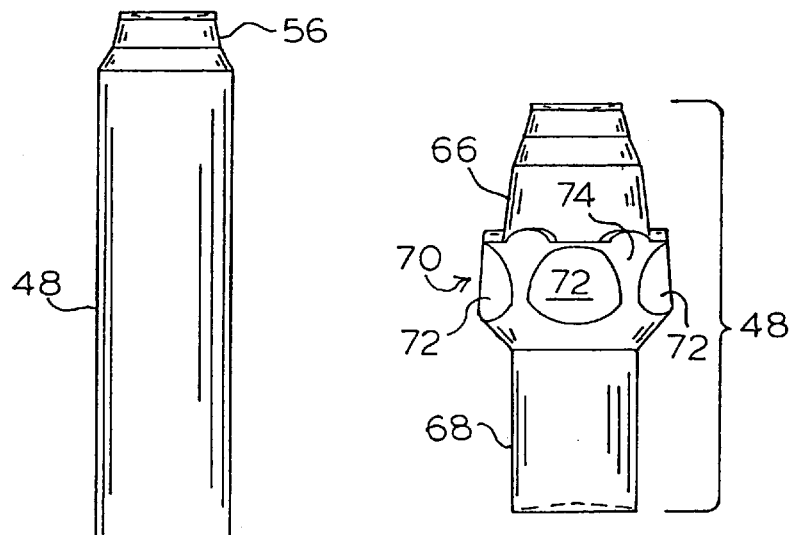
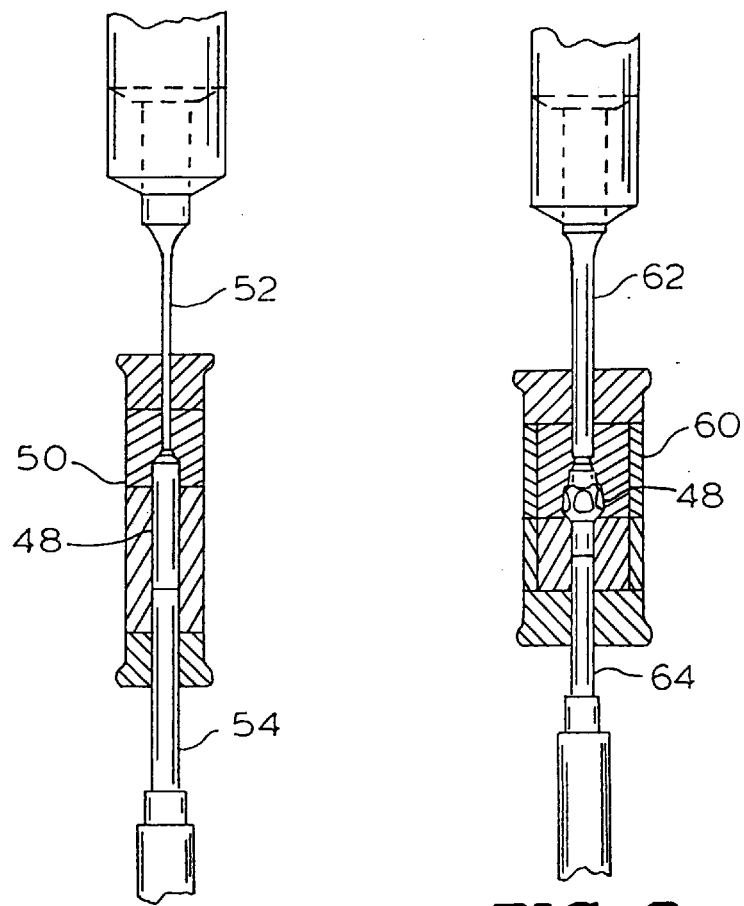
FIG. 7
FIG. 9
FIG. 6
FIG. 8

MANUFACTURE OF GREASE FITTINGS AND BLANKS THEREFOR

FIELD OF THE INVENTION

The present invention relates to grease fittings and more particularly to a method of manufacturing grease fittings and to the grease fitting blanks resulting at intermediate points in such method of manufacture.

BACKGROUND OF THE INVENTION

Grease fittings—sometimes called "Zerk" fittings—have long been used in automobiles and a host of other apparatus for supplying grease to mechanical bushings and bearings without the need to disassemble the bushing or bearing to repack it and without the need to use bulky, awkward, and easily-damaged grease cups.

For years, grease fittings have been made from hex-shaped bar stock that is machined on an automatic screw machine. The bar stock is supplied in rather long lengths that have to be replenished manually at frequent intervals. Also a great deal of scrap is produced in the machining process, and the strength of the resulting fittings is limited by the machining process.

Grease fitting manufacture is largely automated and fairly inexpensive. However, a great many grease fittings are manufactured every year. Therefore, even a modest reduction in the cost of producing each grease fitting can translate into significant savings. Also, any improvement in the quality of the product can position a manufacturer more favorably with respect to its competitors.

Zerk fittings are usually sturdy and reliable. However, they are occasionally broken in service and must be extracted and replaced. Extraction is not usually difficult; because, when a grease fitting breaks in service, it is usually just below the nipple, leaving the threads and hex portion together. Also, if the fitting does break between the threads and the hex portion, there is a ready-made hole available for quick extraction of the remaining threaded portion. However, a stronger nipple structure might reduce the incidence of breakage in service.

SUMMARY OF THE INVENTION

It is an object of the present invention to manufacture a grease fitting by cold forming a grease fitting blank from a cut length of stock to form a thread blank at one end, a grease-gun-mating nipple at the other end and a protrusion having at least one flat surface between the ends of the blank. A thread is formed on the thread blank, and a hole of varying diameter is formed from end to end of the grease fitting blank. A ball and a spring are positioned in the hole and captured in place.

It is another object of the present invention to manufacture a grease fitting by cold forming a grease fitting blank from a cut length of stock to form a thread blank at one end, a grease-gun-mating nipple at the other end and a pressing protrusion between the ends of the blank, for pressing or pushing the grease fitting into place. Ridges are formed on the thread blank to prevent easy removal of the installed grease fitting, and a hole of varying diameter is formed from end to end of the grease fitting blank. A ball and a spring are positioned in the hole and captured in place.

If desired, the grease fitting blank can be heat treated, including case hardening, prior to insertion and capture of the ball and spring. Also, the grease fitting blank can be surface treated for corrosion resistance.

It is also an object of the present invention to make a grease fitting by cutting a length of stock, cold forming a thread blank at one end of the length of stock, cold forming a hexagonal protrusion intermediate the ends of the cut length of stock, cold forming a grease-gun-mating nipple outline at the other end of the cut length of stock, to form a grease fitting blank. A thread is formed on the thread blank, and a hole of varying diameter is formed in the grease fitting blank from one end to the other. The grease fitting blank is heat treated, including case hardening, and also surface treated for corrosion resistance. A ball and spring are inserted into the hole and the larger-diameter end of the hole is formed to capture the ball and spring.

It is another object of the present invention to manufacture a grease fitting production blank from a length of stock material by cold forming a thread blank at one end of a length of stock, cold forming a protrusion, having at least one flat surface thereon, intermediate the ends of the length of stock material, cold forming a grease-gun-mating nipple outline at the other end of the length of stock material, and extracting the thus-formed blank from the cold-forming process.

It is still another object of the present invention to produce an intermediate product in the manufacture of a grease fitting having a thread blank at one end, a grease-gun-mating nipple at the other end, and a protrusion intermediate the ends, the protrusion having at least one flat surface thereon with a pronounced rounded area at each side of the flat surface.

It is yet another object of the present invention to produce an intermediate product in the manufacture of a grease fitting with a thread blank at one end, a substantially-unformed portion adjacent the other end, and a protrusion intermediate the ends with at least one flat surface thereon, with a pronounced rounded area at each side of the flat surface.

BRIEF DESCRIPTION OF THE DRAWINGS

A more complete understanding of the present invention will be had from the following detailed description when considered in conjunction with the accompanying drawings, wherein the same reference numbers refer to the same or corresponding parts shown throughout the several figures, in which:

FIGS. 6–13 illustrate several of the stages in the cold forming of a grease fitting blank, along with the appearance of the blank after each stage of cold forming;

DETAILED DESCRIPTION OF THE BEST MODE AND INDUSTRIAL APPLICABILITY

PRIOR ART

Figure 1:
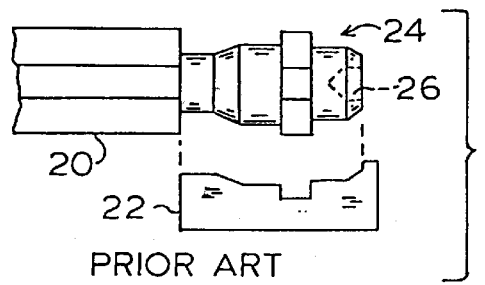
FIGS. 1–5 illustrate various stages in the manufacture of the body of a grease fitting using an automatic screw machine, according to the prior art.

Referring now to the accompanying drawings and more particularly to FIG. 1, as practiced in the prior art, a length of cold-drawn hex stock 20 is rotated in an automatic screw machine (not shown). A cutter 22 cuts a beginning profile 24 of a grease fitting at the end of the hex stock 20, and a start is made on a hole 26 through the center of the resulting grease fitting.

Figure 2:
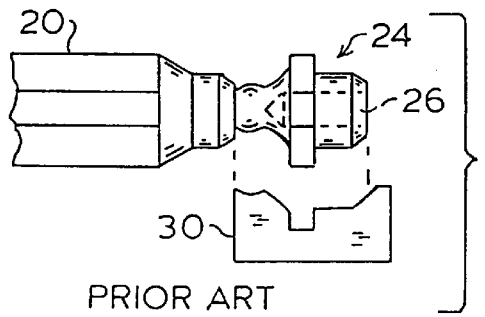

FIG. 2 illustrates a second stage in the automatic screw machining process. A more detailed cutter 30 refines the shape of the profile 24 while the hole 26 is deepened. A rough cut is also made into the hex stock to start the forming of the next grease fitting to be made.

Figure 3:
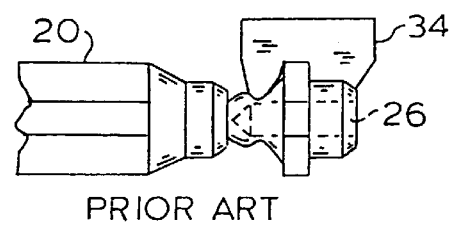

FIG. 3 shows the use of a shaving tool 34 in a shaving process that is often omitted in the manufacture of less precise grease fittings but which minimizes the surface roughness of the resulting fitting and reduces the visible tool marks.

Figure 4:
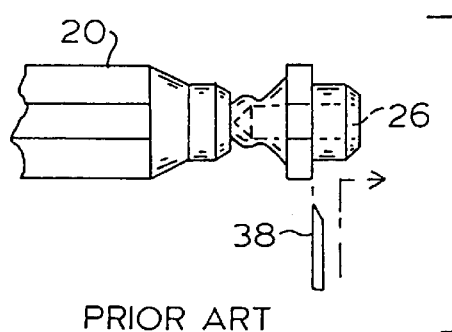

FIG. 4 illustrates the cutting of the threads at one end of the grease fitting. While a single thread cutter 38 is illustrated in FIG. 4, one skilled in the art knows that a thread-cutting die is more commonly used, not unlike the thread-cutting die used by a plumber to cut pipe threads.

Figure 5:
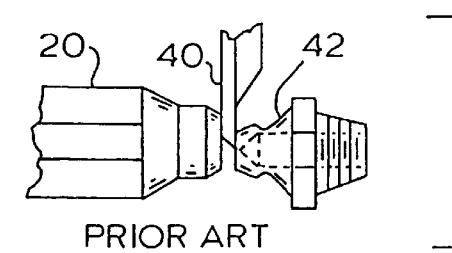

FIG. 5 illustrates the cutoff operation in which the smallest size drill (not shown) forms the last length of the hole within the nipple. A cutoff cutter 40 makes the final cut to free the grease fitting case 49 from the rest of the hex stock 20.

The grease fitting case 42 is then normally heat treated, including case hardening, and is plated with a rust-resistant plating. A valve ball and a ball-valve-closing spring (not shown in FIG. 5 but shown and described with respect to the present invention in connection with FIG. 16) are then placed inside the treated grease fitting case 42. The end of the largest portion of the hole in the grease fitting case 42 is then hot-formed or roll-coined to a smaller diameter to capture the ball and spring.

COLD FORMING BLANKS

Referring now to FIGS. 6–13, the cold forming of grease fitting blanks is illustrated schematically. Preferably, cold-finished, cold-heading-quality carbon steel wire of round cross section is procured in long coils (not shown) for more convenient and less frequent loading into the manufacturing process. This cold-finished round stock is first cut off to the desired length in a conventional shearing operation (not shown).

A sheared length of stock is then transferred to a first die station for forming. The first forming can actually involve some shaping. However, the first station is preferably a sizing station (not shown) where the cut stock is compressed axially while being constrained radially within the die cavity. The axial compression causes the cut stock to shorten slightly and expand slightly in the radial direction in order to fill the die cavity. In this way, the diameter of the stock can be sized accurately for the next steps in the cold forming operation.

After the cold forming sizing operation, the sized length of stock 48 is transferred to a first shaping die 50 (FIG. 6). In the shaping die 50, the length of stock 48 is pressed from both ends by rams 52 and 54. The rams 52 and 54 force the length of stock 48 into the shape of the die, such that the top 56 of the length of stock 48 assumes the shape illustrated in FIG. 7. The shape illustrated at the upper end of the length of stock 48 that is shown in FIG. 7 is the start of a thread blank.

The thus-shaped length of stock 48 is then moved to a second die 60 (FIG. 8). Two axial rams 62 and 64 press the length of stock 48 to assume the shape of the cavity of the die 60. The die 60 is shaped to allow the axial pressing by the rams 62 and 64 to squeeze and make the length of stock 48 expand radially at its central portion so as to try to fill the hex-shaped center section of the cavity. After shaping by cold forming in the cavity of the die 60, the thus-shaped length of stock 48 has the shape illustrated in FIG. 9.

Note that in FIG. 9, the formed length of stock 48 is beginning to take on the exterior shape of a grease fitting. It has a thread blank 66 at one end. There is a basically unformed other end 68, which still shows the generally cylindrical shape of the cold-finished steel round stock that was the raw material at the start of the cold forming operation. There is a very noticeable protrusion 70 intermediate the ends of the length of stock 48 which is beginning to assume the hexagonal shape needed for use with a wrench to tighten the threaded end of the finished grease fitting into place on a bushing. The protrusion 70 already shows flats or flat surfaces 72 for engagement by a wrench, plus large or pronounced rounded ends 74 between the flat surfaces.

The rounded areas at the rounded ends 74 of (ie., between) each flat surface 72 result, in part, from starting with a round stock rather than with a cold-drawn hex stock with six noticeably sharp angles between flats.

Figure 10:
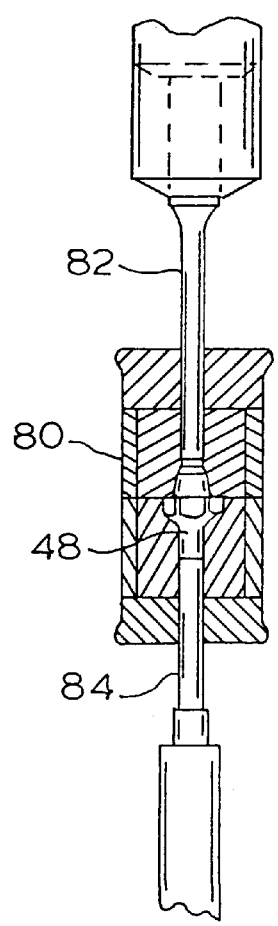

Referring now to FIG. 10, the thus-formed length of stock 48 is now pressed into a die 80 by two rams 82 and 84. The shape of the cavity of the die 80 is intended further to refine the shape of the length of stock 48. The protrusion 70 is now at its final hex shape, or nearly so. The previously unformed other end 68 has been rounded slightly, as shown in FIG. 11.

It would be most desirable to form six sharp corners on the protrusion 70 in order to get maximum contact with a wrench when tightening a fitting into place on a bushing (not shown). However, a grease fitting is not usually tightened as strenuously as a solid screw with the same threading. Therefore, while it would be functionally desirable to form sharp hex corners, it is not necessary. Therefore, the rounded ends 74 between the flat surfaces 72 can be formed to any of a wide range of shapes that the manufacturer deems expedient, attractive, or even decorative. The rounded ends 74 of the flat surfaces 72 are expediently left rounded because it is not necessary to go to the trouble of shaping the steel length of stock with sufficient force and energy to squeeze the steel into six 60-degree corners in the die 60. Also, it is not economically desirable even to form sharp corners in a die, much less in a production part.

Figure 11:
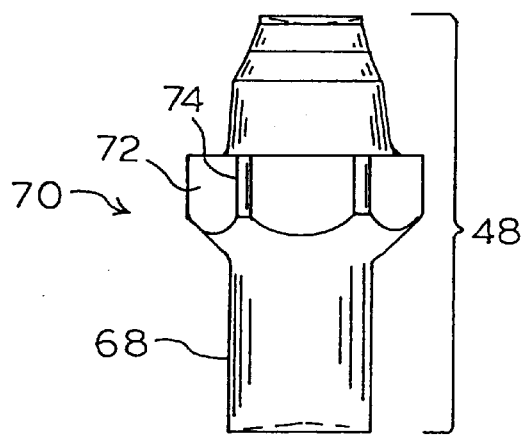

It may be desirable to refine the shapes of the rounded ends 74 of the flat surfaces 72 of the hexagonal center portion 70 of the fitting blank 48 and made them less like those shown in FIG. 9 and more like those shown in FIG. 11. For that purpose, slight bulges can be formed at the ends of the flat surfaces 72, in the die 60 of FIG. 8, to provide a localized source of material for refining the shapes of the flat surfaces in the die 80 in FIG. 10. In this way any of a wide range of desired shapes can be imparted to the rounded ends 74.

Figure 12:
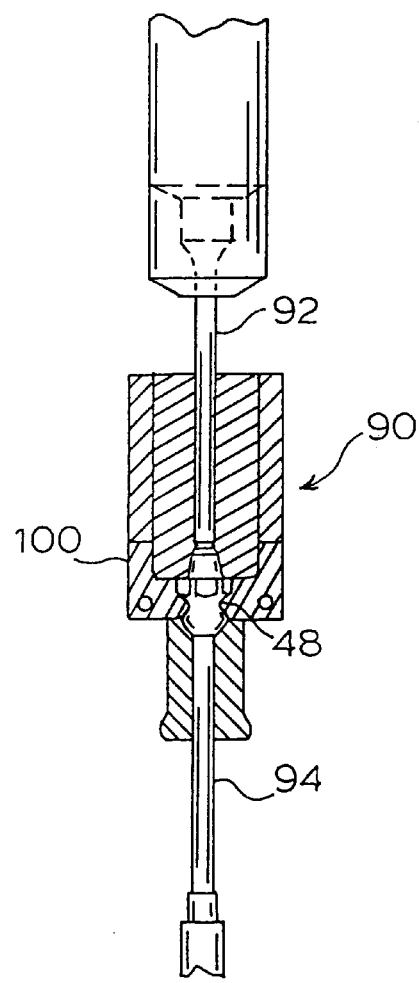

Referring now to FIG. 12, a final die 90 receives the thus-formed length of stock 48 in the form shown in FIG. 11, which is increasingly resembling a grease fitting blank. Two rams 92 and 94 position, constrain, and press the length of stock 48, and a grease-gun-mating nipple 96 (see FIG. 13) is formed at the other end 68 of the length of stock 48 finally to turn that length of stock 48 into a grease fitting blank 98. The grease-gun-mating nipple 96 is formed by a circumferential series of levers 100. The levers are pressed inwardly toward the die 90 at their ends that are remote from the grease fitting blank 98. The ends of the levers 100 that are in engagement with the grease fitting blank 98 squeeze the other end 68 inwardly and downwardly until the other end 68 is formed into and becomes the nipple 96.

The same action of the levers 100 that forms the nipple 96 also extracts the grease fitting blank 98 from the top portion of the die 90 and helps to eject the grease fitting blank 98 from the die.

There is a class of grease fittings that, in use, is pressed into place rather than being screwed into place. These press-type grease fittings have no need for a hexagonal midsection like those illustrated here. However, the press-type grease fittings can still be made from blanks made by the process of the present invention. In such a press-type grease fittings, the center protrusion portion 70 is not hexagonal but is round. There is sufficient diameter of the round center protrusion portion 70 to provide a shoulder or pressing surface (usually conical in shape) suitable for receiving the pressing force necessary to press the grease fitting into place. See FIG. 15 for a visual illustration of how such a press-type grease fitting might look.

It is well known that forming a part by machining off material does little if anything to refine and strengthen the material of which a manufactured part or product is formed. However, it is also well known that forging, either hot forming or cold forming, causes the material to flow. The grain size of the material is reduced and the grain boundaries tend to more nearly follow the general contour of the resulting part. Such refining of the material in the forging process tends to strengthen the resulting part or product. This is the reason for requiring many high-strength bolts for the aircraft industry to be hot or cold formed rather than cut from bar stock. Counterfeit aircraft parts made from machined hexagonal bar stock rather than by the required forged forming will soon break in service. Therefore, by cold forming the grease fitting blank 98, it is made stronger and less likely to break in service. Increases in strength of 12% or more have been realized in grease fittings made by cold forming, over those machined from hexagonal cold-drawn stock.

FURTHER FORMING

Figure 13:
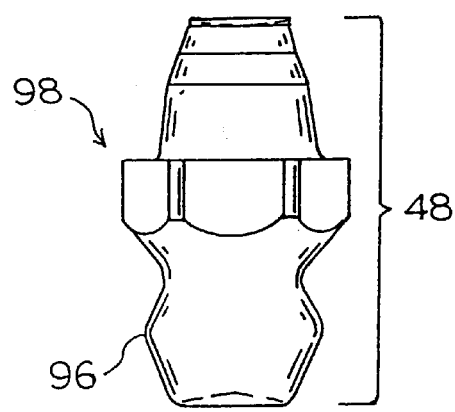
Figure 14:
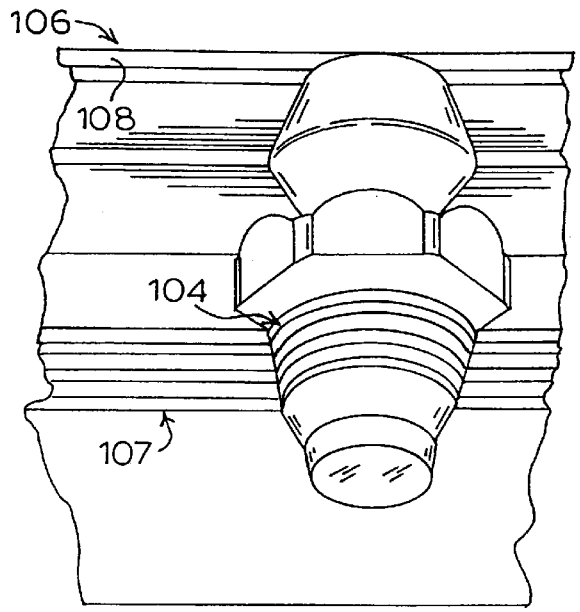
FIG. 14 illustrates the roll forming of threads at one end of the grease fitting blank.

The grease fitting blank 98 is now fully formed, as shown in FIG. 13. However, in order to assure good quality of finish of the nipple 96, the nipple is preferably burnished to smooth and refine its surface. Referring now to FIG. 14, in the same tool and preferably simultaneously with the burnishing operation, a suitable screw thread 104 is preferably rolled onto the thread blank 66. The burnishing and rolling are done on a conventional burnishing and thread rolling mechanism comprising a fixed burnishing die 106 and a fixed thread-rolling die 107. These fixed dies are preferably integrally formed together with space between them to accommodate the hex portion of the fitting blank 98. The fixed dies are linear in shape and cooperate with companion movable dies (not shown) to burnish the nipple and roll-form the threads.

A fitting blank 98 is pushed into a gap between the fixed and movable dies. The movable dies then move linearly with respect to the fixed dies in order to roll the fitting between the dies. The threads on the thread-rolling dies are sloped at the same angle as the helix that the threads will form on the fitting—that slope is not shown in FIG. 14, for simplicity. Therefore, the fitting blank 98 need not move, in its axial direction, as it is rolled between the fixed and movable dies.

The burnishing die 106 and its companion movable burnishing die include a retaining lip. The retaining lip on the fixed burnishing die is identified by the reference number 108 in FIG. 14. The retaining lip 108 and its companion on the movable die are intended to keep the fitting blank 98 from moving axially closer to the burnishing die 106 as the thread is rolled onto the thread blank 66. The angle of the threads in the thread-rolling die 107 is such as to produce a thrust force tending to push the fitting blank in the direction from the thread-rolling die 107 toward the burnishing die 106. After the fitting blank 98 has been burnished and roll-formed enough, it drops from the dies. The movable dies then traverse to their original position for insertion of another fitting blank 98.

Figure 15:
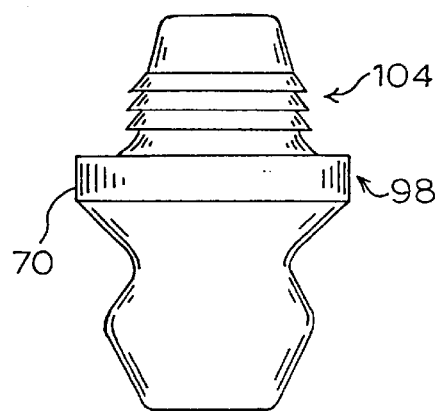
FIG. 15 illustrates a roll-formed grease fitting blank in which the central portion of the fitting is rounded for pushing the fitting into place rather than threading the fitting into place and in which there are barb-like ridges or rings rather than threads.

In the case of push-type or press-type grease fittings, such as shown in FIG. 15 and as mentioned above, the screw thread 104 is usually replaced by a series of barb-like serrations, ridges, or rings 104. The serrations 104 are arranged to prevent the pressed-in grease fitting from working its way out of place. The side view of such serrations 104 usually exhibits a saw-tooth appearance. The serrations can be rolled into the thread-blank portion 66 of the grease fitting just like the screw threads. However, there will be no helix angle to the serration form on the die 107 since there will be no helix angle to the serrations.

Figure 16:
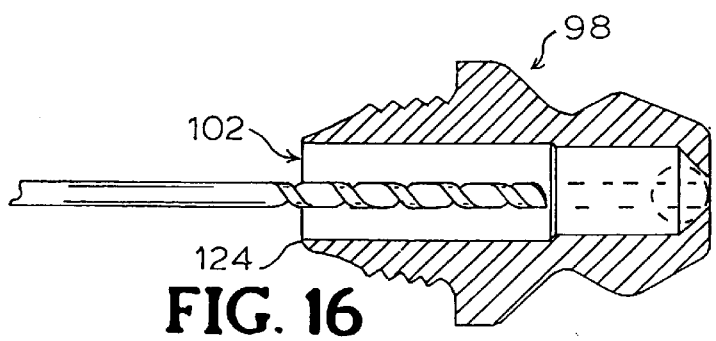
FIG. 16 illustrates the drilling of a hole of varying diameter through the center of the cold-formed grease fitting blank.

Referring now to FIG. 16, after burnishing and thread forming, a hole 102 of varying diameter or of multiple diameters is drilled axially through the fitting blank 98, preferably one diameter at a time. The drilling operation is preferably started by drilling a centering hole from preferably the threaded end of the fitting blank. Preferably, a fairly large diameter drill (for stiffness) is used for drilling the centering hole. Such a centering drill usually has a "stinger" drill at its tip. The stinger is a short drill bit formed at the cutting end of the centering drill. The stinger, being small in diameter but very short, is thus stiff and drills a very straight hole with the cutting end of the larger, base drill forming a conical depression in the end of the fitting blank, around the hole drilled by the stinger.

The largest hole diameter is drilled first, as far as required into the end of the fitting blank. An intermediate diameter drill is then used to extend the hole almost all the way through the length of the grease fitting blank. This intermediate diameter drill stops just short of the right-hand end of the nipple (as seen in FIG. 16). The intermediate-size drill stops leaving an interior base at the nipple end of the grease fitting blank that is suitable for use as the seat of the ball of a one-way ball valve, the ball of which is depicted in dotted lines in FIG. 16. The smallest size drill is then used to complete the hole 102 to the opposite end of the fitting blank 98.

Figure 17:
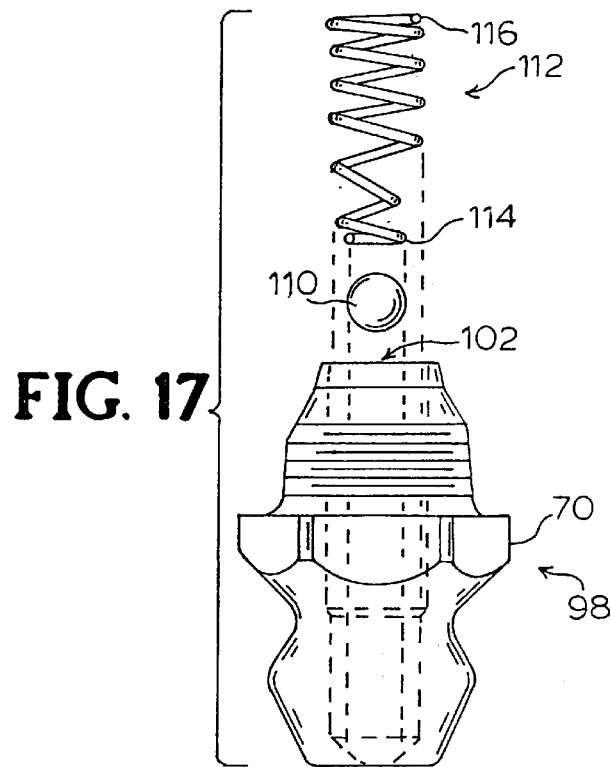
FIG. 17 illustrates inserting the valve ball and spring into the multi-diameter hole in the grease fitting.

The larger diameter of the hole at the threaded end of the fitting blank 98 is intended better to accommodate insertion of the ball and spring, which is depicted in FIG. 17 and described below.

Either the hole 102 or the thread 104 can be formed first. However, it is preferable to form the thread 104 first so that, in the operation of rolling the thread into the thread blank 66, the radially-inward force of the rolling operation does not cause the side of the thread blank 66 to collapse into the hole 102.

HEAT TREATING AND PLATING

Once the fitting blank 98 has been fully formed, burnished, threaded, and drilled, it is ready for heat treatment and anticorrosion treatment. The fitting blank 98 is conventionally heat treated in a process which includes a conventional case hardening process or treatment. After case hardening and heat treatment, the fitting blank 98 is conventionally treated with a bright zinc plating for corrosion protection.

ASSEMBLING

Referring now to FIG. 17, after heat treatment and plating, a ball 110 is dropped into the larger end of the hole 102 and comes to rest against the smallest diameter of the hole at the other end of the grease fitting blank 98, in the location depicted by the dotted lines in FIG. 16. A spring 112 is then dropped into the hole 102 on top of the ball 110.

For ease of inserting or dropping the spring into the hole 102, the hole has been drilled to two spring-accommodating diameters, and the spring has been wound with two outside diameters 114 and 116. The smaller diameter portion 114 of the spring 112 enters the hole 102 first. With the smallest diameter portion 114 of the spring 112 entering the largest diameter of the hole 102, the spring 112 enjoys the greatest clearance and greatest likelihood of not missing the hole. As the spring continues into the hole 102, the smaller diameter portion 114 of the spring 112 more easily enters the intermediate diameter portion of the hole and rests on top of the ball 110. Meanwhile the larger diameter portion 116 of the spring 112 easily follows and enters the largest diameter portion of the hole 102.

Figure 18:
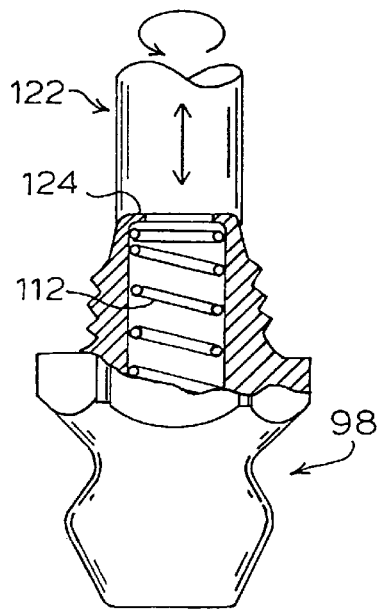
FIG. 18 illustrates the hot coining or forming of the larger end of the hole to capture the spring and ball within the hole of the grease fitting.

The next assembly operation is to capture the spring and ball within the grease fitting blank 98. In the preferred cold forming operation (see FIG. 18), a ram 122, with a conical forming surface, descends, pressing on the top, circular lip 124 of the grease fitting blank 98 (see also FIG. 16) so as to cam and bend that lip in an inward direction. In the preferred method, the ram 122 has a radially-extending ridge on its conical forming surface. The ram is rotated or spun as it descends, thereby cold forming only the portion of the lip 124 that is immediately beneith and in front of the ridge. Alternatively, the ram 122 has no ridge on its conical forming surface and is not rotated but simply descends and simultaneously forms the entire lip in a downward and inward direction. Another alternative method is to hot form the lip 124.

The spring 112 has a free length such that the top of the spring is positioned just below the level of the top of the lip 124. Therefore, when the lip 124 is formed or bent in a downward and inward direction, it presses and cams down the top of the spring 112, always keeping the spring below the top of the lip. When the lip 124 has been formed downward and inward sufficiently to assure reliable capture of the spring 112, the ram 122 is withdrawn. The top end of the spring 112 is then in its final position bearing against the inside of the formed lip 124 of the grease fitting 98. The grease fitting, once finally inspected, is now ready to be packaged and shipped.

While the form of apparatus herein described constitutes a preferred embodiment of this invention, it is to be understood that the invention is not limited to this precise form of apparatus, and that changes may be made therein without departing from the scope of the invention which is defined in the appended claims.

We claim:

1. A method of making a grease fitting comprising the steps of:

cold forming a cut length of stock having two ends to form:
   a thread blank at one end thereof,
   a grease-gun-mating nipple outline at the other end thereof, said grease-gun-mating nipple outline being of a size and shape adapted for mating with a grease gun, and
   a protrusion intermediate the ends of said cut length of stock, said protrusion having:
      a maximum diameter greater than the original diameter of the cut length of stock,
      six flat surfaces on its perimeter defining a hexagonal shape suitable for tigtening the finished grease fitting into place, and
      rounded ends separating each pair of flat surfaces of said hexagonal shape, said rounded ends resulting from incompletely forming said hexagonal shape;

forming an exterior thread on said thread blank;

forming a hole of varying diameter extending from said one end to said other end of the cut length of stock;

inserting a ball and spring into said hole from said one end, said ball being large enough to be captured by the portion of said hole that is of minimum diameter; and forming said one end of said thus-formed cut length of stock to reduce the diameter of said hole at said one end so as to capture said spring and prevent said spring from escaping from said hole.

2. A method of making a grease fitting comprising the steps of:

obtaining a cut length of stock having two ends;

cold forming a thread blank at one end of the cut length of stock;

cold forming a hexagonal-shaped protrusion intermediate the ends of the cut length of stock, said protrusion having a maximum diameter greater than the original diameter of said length of stock;

cold forming a grease-gun-mating nipple outline at the other end of the cut length of stock;

forming an exterior thread on said thread blank;

forming a hole of varying diameter extending from said one end to said other end of the thus-formed cut length of stock;

heat treating, including case hardening, said thus-formed cut length of stock;

inserting a ball and spring into said hole from said one end, said ball being large enough to be captured by the portion of said hole that is of minimum diameter; and forming said one end of said thus-formed cut length of stock to reduce the diameter of said hole at said one end so as to capture said spring and prevent said sprint from escaping from said hole;

wherein said step of cold forming a hexagonal-shaped protrusion further comprises incompletely forming the six flat surfaces that make up said protrusion so as to leave a rounded area between each pair of said six flat surfaces.

* * * * *

UNITED STATES PATENT AND TRADEMARK OFFICE
CERTIFICATE OF CORRECTION

PATENT NO. : 5,906,047
DATED : May 25, 1999
INVENTOR(S) : Daniel S. Miller, et al.

It is certified that error appears in the above-identified patent and that said Letters Patent is hereby corrected as shown below:

Column 5, line 54, insert --machine-- before "tool".

Signed and Sealed this

Fourth Day of January, 2000

Attest:

*Attesting Officer*

*Acting Commissioner of Patents and Trademarks*